June 30, 1925.

J. T. LITTLETON, JR., ET AL 1,543,779

MANUFACTURE OF INSULATORS

Filed June 29, 1922  4 Sheets-Sheet 1

J. T. Littleton Jr.
G. S. Fulcher,
INVENTORS

BY
ATTORNEY

June 30, 1925.

J. T. LITTLETON, JR., ET AL 1,543,779

MANUFACTURE OF INSULATORS

Filed June 29, 1922    4 Sheets-Sheet 2

J. T. Littleton Jr.
G. S. Fulcher
INVENTORS

BY
ATTORNEY

June 30, 1925. 1,543,779
J. T. LITTLETON, JR., ET AL
MANUFACTURE OF INSULATORS
Filed June 29, 1922 4 Sheets-Sheet 3
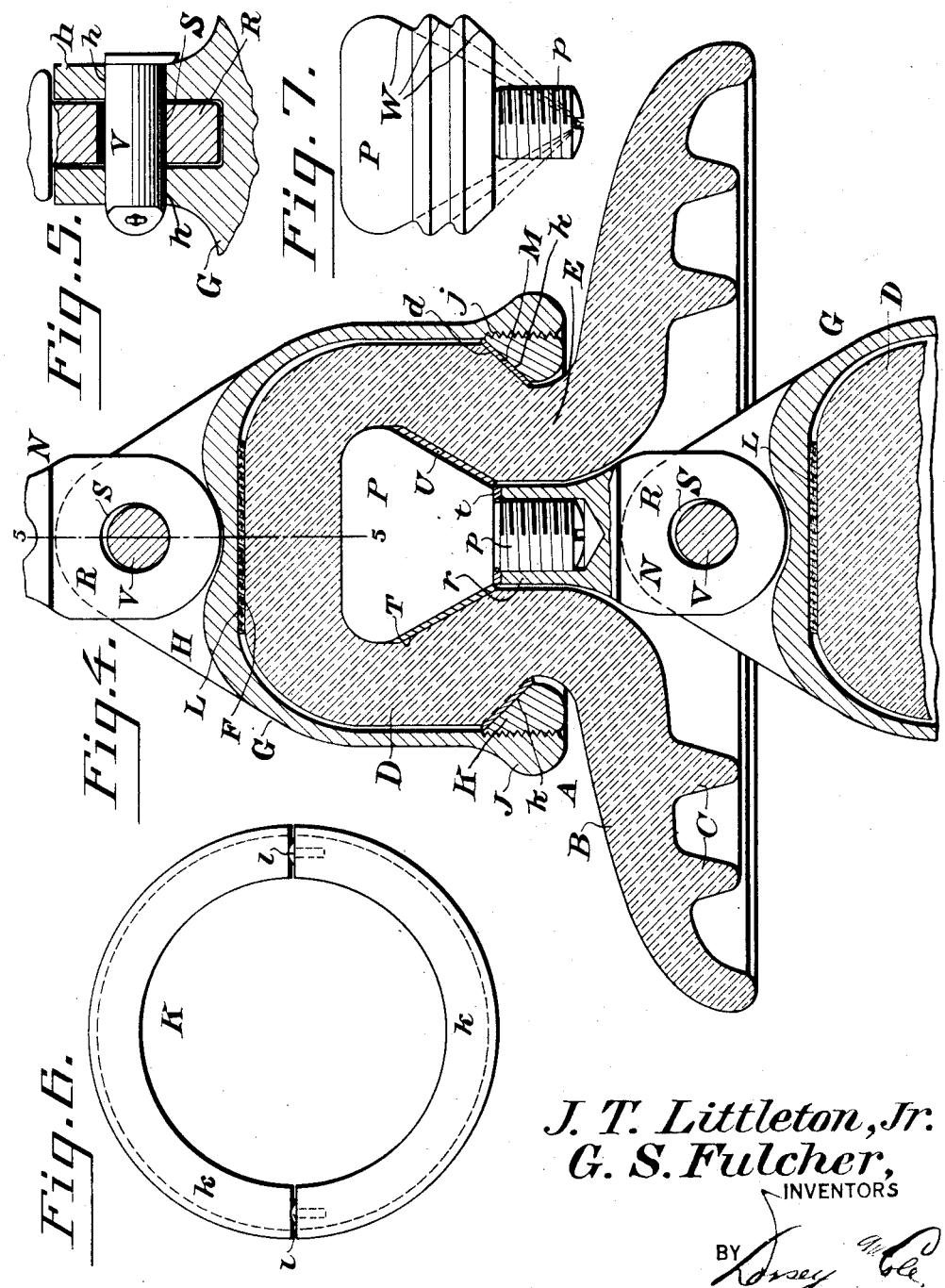
J. T. Littleton, Jr.
G. S. Fulcher,
INVENTORS
BY
ATTORNEY June 30, 1925.
J. T. LITTLETON, JR., ET AL
1,543,779
MANUFACTURE OF INSULATORS
Filed June 29, 1922    4 Sheets-Sheet 4
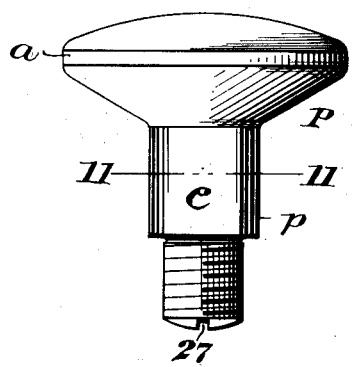
Fig. 8.
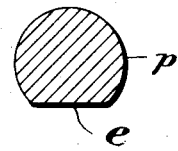
Fig. 11.
Fig. 9.
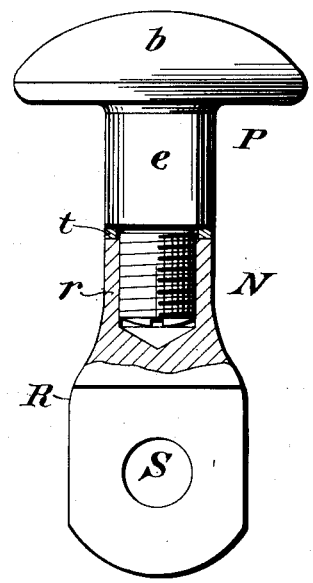
Fig. 10.
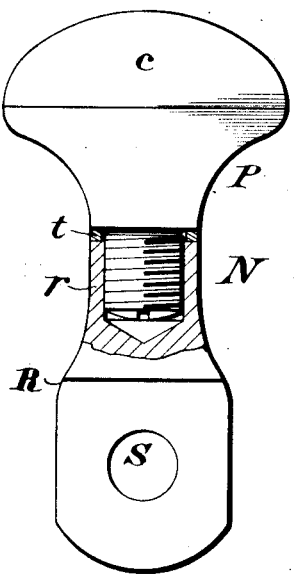
J. T. Littleton Jr,
G. S. Fulcher,
INVENTORS
BY
ATTORNEY Patented June 30, 1925.

1,543,779

UNITED STATES PATENT OFFICE.

JESSE T. LITTLETON, JR., AND GORDON S. FULCHER, OF CORNING, NEW YORK, ASSIGNORS TO CORNING GLASS WORKS, OF CORNING, NEW YORK, A CORPORATION OF NEW YORK.

MANUFACTURE OF INSULATORS.

Application filed June 29, 1922. Serial No. 571,676.

*To all whom it may concern:*

Be it known that we, JESSE T. LITTLETON, Jr., and GORDON S. FULCHER, citizens of the United States, residing at Corning, in the county of Steuben and State of New York, have invented new and useful Improvements in the Manufacture of Insulators, of which the following is a specification.

Our invention relates to suspension insulators of the high tension type.

The prime object of our invention is to provide an insulator which will sustain a greater mechanical load, and which will have a longer life than the porcelain insulators now generally used.

Greater mechanical strength is obtained by the novel design and construction hereinafter described in detail. The main feature of this design is the provision of a headed suspension pin that is molded into the insulating material, and an inverted cap enclosing the knob of the insulator, the pin and cap being so disposed that when the insulator is subjected to tension the insulating material between the bearing parts of the pin and cap is for the most part under compression. It is well-known that most materials are stronger under compression than under tension.

It is an accepted fact that after a few years of exposure to the weather, in service, or in storage, porcelain insulators having their metal parts attached to the insulating body with cement, begin to break in considerable numbers. It is generally believed, as the result of experiments and observations, that this breakage is due to a slow change of the cement with time and exposure.

By our invention the suspension pin and terminal cap of the insulator are so designed as to require no cementing material of any kind to prevent them from pulling away from the insulating material. We insert gaskets in the form of layers of lead, solder, or other soft metal between each of the metal fittings and the insulating material, but these gaskets serve as cushions to distribute the load more uniformly and thus secure greater strength. As such gaskets are composed of noncorrosive material they are not affected by the weather, nor do they change with time.

While any insulating material which can be molded around a headed pin may be used in making insulators according to our invention, such as bakelite, or the like, we prefer to manufacture our insulators out of some suitable glass, such as shown in U. S. Patent, 1,304,623, to Sullivan and Taylor, because of its low thermal expansion, its chemical stability or resistance to corrosion, and its excellent electrical properties, e. g., low power loss and high dielectric strength The accompanying illustrations and the following description set forth in detail certain means and modes for carrying out our invention, such disclosed means and modes constituting, however, but several of the various mechanical forms in which the principle of the invention may be used.

In the accompanying drawings:—

Fig. 4, is a sectional view of the assembled insulator;

Fig. 5, is a vertical transverse section taken on the line 5—5 of Fig. 4, showing in detail the locking pin for the terminal cap;

Fig. 6, is a plan of the ring used in fastening the terminal cap to the insulator knob;

Figure 1:
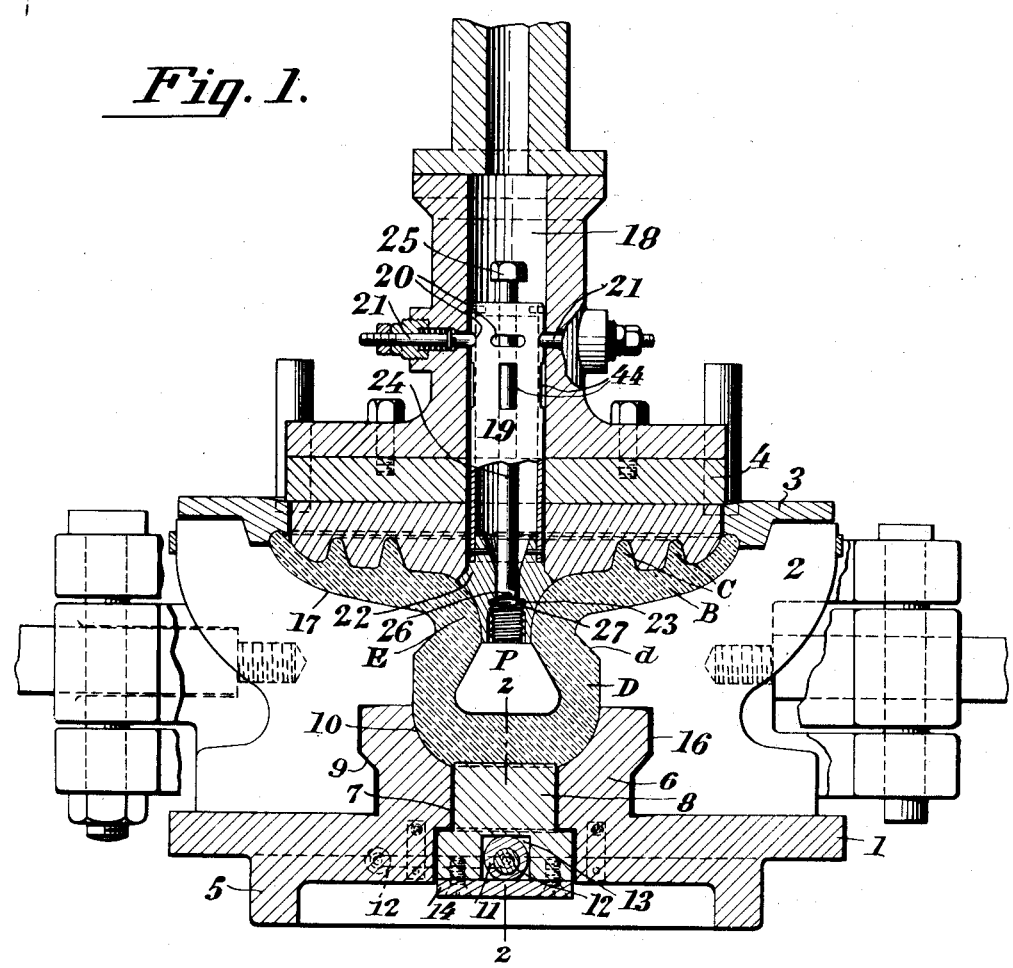
Figure 1, is a vertical section of a mold used in forming a suspension type of insulator constructed in accordance with our invention, the mold plunger and associated parts being shown depressed, while the mold valve is shown raised.

Figs. 7, 8, 9, and 10 are views of modified forms of suspension pins, and

Fig. 11, is a section on the line 11—11 of Fig. 8.

By our invention, the suspension pin is pressed into the insulating material at the time such material is being molded. This is accomplished by attaching the pin to the mold plunger, and using the head of the pin as means for distributing the material throughout the lower portion of the mold cavity. The head of the pin is detachably fixed to the mold plunger, and when such plunger is withdrawn from the mold after pressing, the pin is disconnected therefrom so that it will remain positioned in the material.

In continuing the operation of forming the insulator, we next affix an apparatus comprising a jig to the mold, such apparatus including means for turning the pin to force its head further into the partially set material forming the knob of the insulator, after the mold valve below the knob has been lowered.

Referring now to Fig. 4, the insulator is shown as comprising a body A of some suitable insulating material shaped to provide the petticoat B, with depending flanges C, and knob D. In the construction illustrated, the lower portion of the knob D is beveled inwardly as at $d$ where the knob merges with the petticoat B, to provide a constricted neck portion E, the upper surface of the knob being rounded between its side walls and top F, as shown.

The terminal G comprising a bifurcated connector H having alinged perforations $h$ and the inverted cup-shaped part or cap G, is shaped so that the inner wall, or that part of the inner wall adjacent the outer wall of the knob D, is substantially parallel to the outer surface of the knob, but so that the inner diameter of the rim J of said cap is great enough to pass over the largest diameter of said knob. The rim J is made somewhat thicker than the body of the cap G, so as to avoid sharp corners which would tend to localize electrical stresses, and the interior of the cap adjacent to such rim is threaded, as at $j$, for the reception of an externally threaded ring K. The ring K is made in two semi-circular parts (see Fig. 6) so that the ring can be positioned around the neck of the knob D. The ring is preferably threaded before it is split and in this case, the pins $l$ are inserted to maintain the circular form. The upper annular surface of the ring K is beveled as at $k$, the beveled surface being substantially parallel to the beveled portion $d$ of the knob D.

As it is the beveled portions of the knob and ring which are relied upon for mechanical connection, when the terminal G is being assembled to the insulator body A, a gasket L, of cork or other suitable material is interposed between the terminal and the top F, of the knob, while a metal gasket M, of lead, solder, or some other soft material, is interposed between the annular beveled face $k$ of the ring and the beveled portion $d$ of the knob. The ring K is screwed upwardly sufficiently to compress both of the gaskets L and M against the insulator knob. As the interior of the cap of the terminal G is larger than the knob D, the inner walls of the terminal will be spaced from the knob, as shown. We do not limit ourselves to the particular design of terminal cap illustrated, nor to the method of assembling it.

Depending from the insulator A, is a second terminal in the form of a suspension pin N which is designed to be connected to the portion H of the cap of the next succeeding insulator by any means, as by a pin V, (Fig. 5). The suspension pin comprises a head P, having a depending threaded shank $p$, and a lower part R having its upper portion $r$ threaded to the shank $p$, a washer $t$ being interposed between the two, as shown. The bottom of the pin terminates in a flattened portion having a perforation S through which passes the pin V when the insulators are assembled in series.

The cavity T is formed by the head P during the molding operation, and, therefore, it is of substantially the same shape as the shape of the head P. However, during the forming operation, the side walls of the head are spaced from the side walls of the cavity, and into this space is poured molten metal such as lead or solder, which metal forms a gasket U that serves as means for cushioning the head of the pin against the sides of the knob of the insulator, thus distributing the load more uniformly and reducing to a minimum the tendency of the metal pin to cause excessive strains in the insulating body, due to localized stresses, as will be readily understood.

It will, therefore, be evident that this construction is very strong since the material between the suspension pin and the ring K is placed in compression when the insulator is put under tension. Furthermore, since the outer diameter at the top of the suspension pin is nearly as great as the inner diameter of the ring K, it will be impossible to pull the pin out without substantially pulverizing the insulating material between the pin and ring. In practice it is found that the metal parts will give way before the head of the pin will pull out of the cap.

Figure 3:
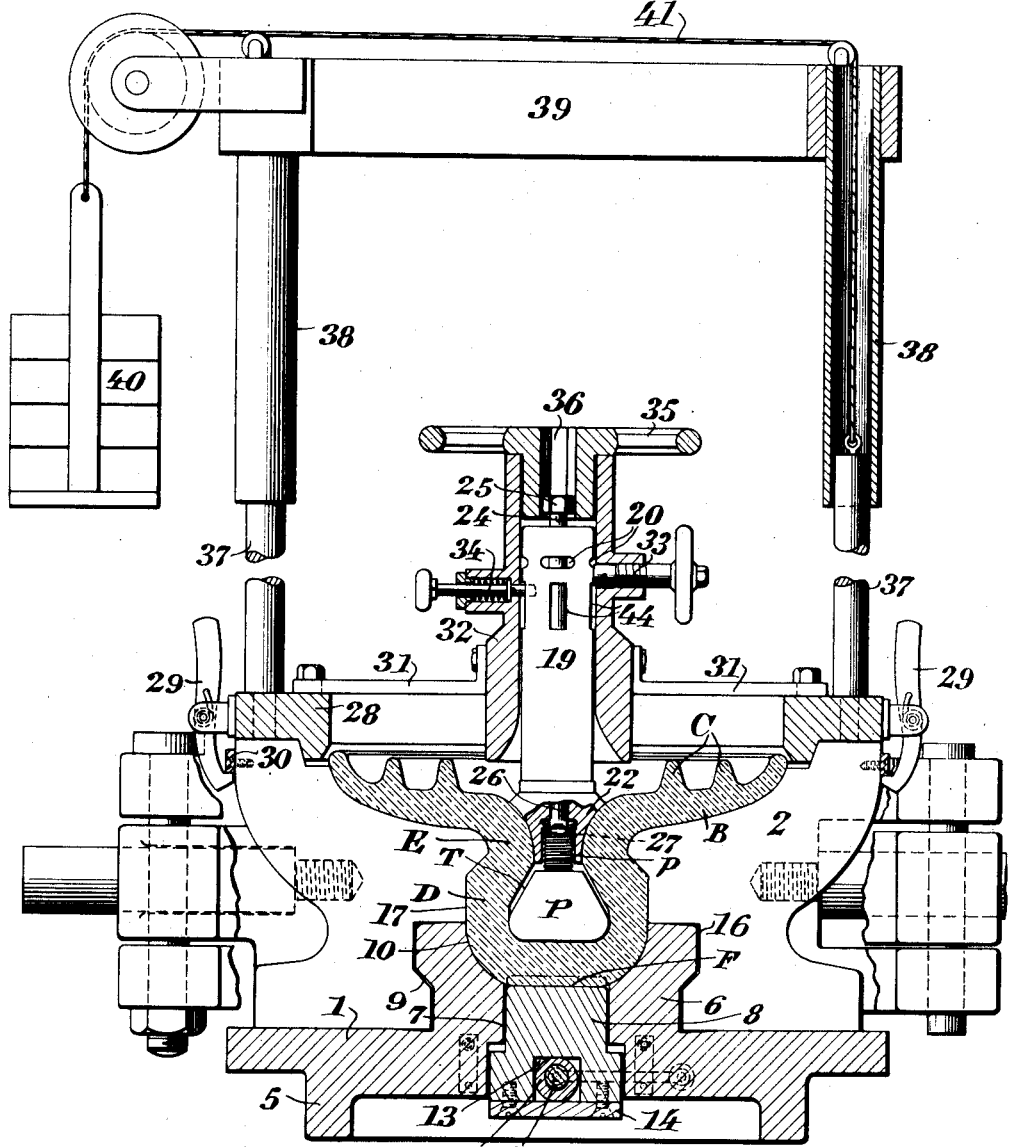
Fig. 3, is a view similar to Fig. 1, showing the mold and apparatus associated therewith, which is used for the purpose of forming the space between the bearing surface of the suspension pin and the insulating material.

The head P of the suspension pin may be of any shape desired. The preferred form is illustrated in Figs. 1, 3, and 4 and comprises an inverted cone having a flat top and straight inclined side walls. Instead of the head of the pin P being formed of one cone, a series of conical surfaces W may be used, providing such surfaces have their apexes at approximately the same point, as is shown by Fig. 7.

The reason for shaping the head of the pin in the form of one or more cones is the fact, that when a cone of homogeneous material is heated or cooled uniformly, the angle of the cone always remains the same. If, then, a cone of metal fits accurately into a hollow cone of glass or any other material at one temperature, it will also fit such hollow cone at any other temperature, irrespective of the coefficients of expansion of the two materials. Likewise, the series of conical surfaces with the same apex, of a pin such as that shown in Fig. 7 will accurately fit at all temperatures below the casting temperatures, a corresponding series of hollow conical surfaces of any material molded around the pin, if the coefficient of expansion of the pin is higher than that of the outer material, so that on cooling the outer material will not tend to crush the pin. The two materials must make good contact, and yet they must be free to slide on each other. If one material sticks to the other, some third material must be used in between which does not stick to both. It is important, that at the time of setting or forming, each material shall be of fairly uniform temperature.

If so desired, the suspension pin may be made in one piece. However, as all of the exposed metal parts of the insulator are coated with zinc, it may be easier to coat the lower part R of the suspension pin while such part is detached from the insulator. If the suspension pin is coated with zinc before being positioned in the insulator, and if during the operation of forming the insulator in the mold, it becomes too hot, the zinc will be vaporized off.

Furthermore, if so desired the shape of the head of the pin can be altered to suit varying conditions; thus in Fig. 8, we have shown the pin with flattened or elliptical shaped head $a$, while as shown in Fig. 9, the pin may have a mushroom shaped head $b$, or as shown in Fig. 10, the head $c$ of the pin may be formed with its top rounded and its sides curved inwardly. If, as shown in Figs. 8 and 9, the shank of the pin is straight for an appreciable distance below its head, it is necessary to provide a passage-way along such shank for the molten metal that is poured around the head to form the gasket U. The passage may be of any form desired, such as a groove formed in the shank of the pin, or the shank of the pin may be flattened as at $e$ (Fig. 11).

In manufacturing insulators according to our invention, use can be made of any approved apparatus. However, for the purpose of illustration we have, in Figs. 1, 2, and 3, of the drawings, shown a structure which has proven practical in service in making insulators out of glass.

Use is made of a mold (Fig. 1) comprising a base 1, hinged-halves 2 that are carried by the base, a removable plunger ring 3, and plunger 4. Each of the above-named elements is designed to be quickly assembled and disassembled during the production of the insulators.

The base 1, which comprises a flat bottom portion provided with a depending supporting flange 5, has centrally formed thereon an upstanding boss 6 which is axially bored, as at 7, to receive a valve 8. The upper half of the boss 6 is of greater diameter than its lower portion, an inclined shoulder 9 connecting the two portions of the boss.

The upper portion of the bore 7 of the boss is flared or rounded outwardly, as shown, to provide a recess 10 that serves as the bottom of the mold cavity, the contour of the recess conforming to the shape of the upper portion of the knob D of the insulator.

Figure 2:
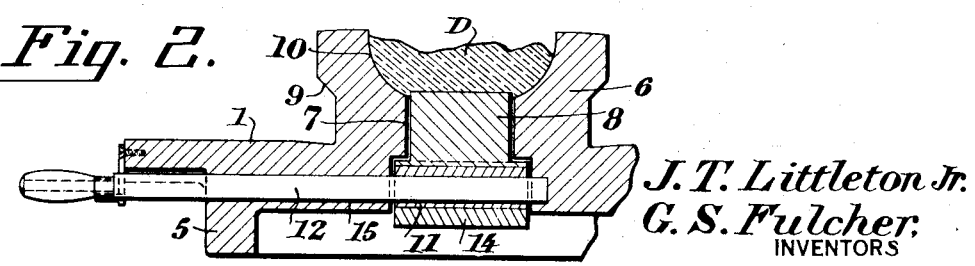
Fig. 2, is a vertical transverse section taken on the line 2—2 of Fig. 1, showing the mold valve actuating mechanism.

The valve 8, is so mounted in the bore 7 that its movement within the bore is limited. For the purpose of raising and lowering the valve a predetermined distance, the bottom of the valve carries a bushing 11 that has an eccentrically mounted crank 12. The bushing 11 is preferably positioned in a transverse slot 13 formed in the valve, being retained in the slot by means of a plate 14 fastened to the underside of the valve, while the crank 12 is supported by openings 15 formed in the base 1, as shown by Fig. 2. When the crank is swung through an arc of 180 degrees from the dotted line position shown by Fig. 1 to a corresponding position on the other side of the valve, (as shown by Fig. 3), the latter will be lowered from the full line position to the dotted line position (Fig. 1) thus leaving a space beneath the pressed material in the mold, the purpose of which will be hereinafter more fully described.

The halves 2, of the mold, are designed to be closed around the boss 6, during the operation of forming the insulators, and, therefore, they are recessed, as at 16, to snugly engage the boss. A mold cavity 17 is formed in the halves 2 above the recess 16. This cavity is of the desired contour to form the vertical walls of the knob D, the constricted neck portion E, and the petticoat B, of the insulator. Adapted to be seated upon the halves 2 of the mold and guide the plunger 4 in the usual manner, is the ring 3 which cooperates with the plunger 4 to form the flanges C of the insulator. The mold parts just described may be mounted upon any approved type of pressing mechanism.

The plunger 4 is provided with a vertical bore 18 in which is mounted a carrier for the head P of the suspension pin, that is to be pressed into the knob of the insulator. The carrier comprises a tube 19, which is provided with a series of openings 20 near its upper end that receive the inner ends of a plurality of spring pressed locking pins 21 carried by the shank of the plunger. The bottom of the tube is closed by means of a plug 22 having internal threads 23 for receiving the threaded shank p of the suspension pin head P. In the present instance the plug 22 is shown as having only two threads formed therein, whereby the suspension pin can be quickly detached therefrom as will be hereinafter fully described. The plug is so designed that its exterior surface conforms to the shape of the throat of the insulator, and the plug cooperates with the bottom of the plunger to impart the desired configuration to this portion of the insulator.

Slidably mounted in the tube 19 is a rod 24 having a head 25 projecting above the top of the tube and its lower end 26, formed like the lower end of a screw-driver. The threaded shank p of the suspension pin is provided with a transverse slot 27 that receives the lower end 26 of the rod 24 when the parts are assembled in the mold as shown by Fig. 1.

In the operation of the mold, and assuming that the plunger 4 and ring 3 are in raised position, the halves 2 are closed around the base 1, being locked in position in the usual manner, and the valve 8 is raised, or set in the position shown by Fig. 1. A charge of soft viscous material is next deposited in the mold cavity. When the plunger 4 is lowered, the ring 3 will be seated upon the top of the halves 2 in advance of the entrance of the plunger into the mold cavity, and immediately following this, the plunger carrying a pin that has been preheated to a suitable temperature will enter the mold.

As the head P of the suspension pin projects downwardly below the lower face of the plunger, the head will enter the material in advance of the main body of the plunger, and in so doing will force the soft material into the lower part of the mold cavity, the surplus material being forced upwardly through the restricted throat of the cavity where it comes in contact with the face of the plunger, which latter distributes it throughout the rest of the mold cavity.

The plunger and associated parts remain lowered until the material has set the desired amount, whereupon the operator withdraws the plunger thereby automatically releasing the suspension pin carrier from the plunger, and the carrier remains in position in the mold. The mold is then moved from beneath the plunger.

The next step consists in forcing the head P of the suspension pin further into the material of the knob D, so as to provide a space around the walls of the head. For this purpose we prefer to utilize a jig that is seated on the top of the mold. The jig includes a ring 28 having pivotally mounted on its periphery a plurality of latches 29 by means of which the jig may be firmly, yet detachably, secured to the top of the mold, the latches engaging an annular band 30 carried by the rim of the halves 2 of the mold, as shown by Fig. 3.

Carried in the center of the ring 28 by means of arms 31 is a chuck 32 having its interior bored to snugly fit the tube 19. Threaded into one side of the chuck is a set screw 33 having its outer end provided with a hand wheel, by means of which, the screw can be quickly turned to lock the parts in place. Diametrically opposite the set-screw 33, the chuck 32 carries a spring pressed headed locking-pin 34 that engages one of a series of slots 44 formed in the tube 19 to prevent the tube from turning in the chuck during subsequent operations of the apparatus. Revolubly mounted on top of the chuck is a hand wheel 35 having a central opening 36 for receiving the head 25 of the rod 24. The opening 36 and head 25 are shown hexagonal, but they can be of any other desired angular form. The ring 28 also carries a pair of vertical standards 37 upon which are slidably mounted tubular rods 38 having their upper ends connected by a horizontal bar 39 which is permanently attached and affixed to some portion of the machine so that the counterweight 40, which is connected to the standards 37 by the cables 41, will counterbalance the ring 28, thus allowing it to be readily raised when the latches 29 are depressed to disengage the annular band 30.

When the parts of the apparatus have been positioned to support the suspension pin carrier, the mold valve 8 is lowered as previously described, to provide a space between the top of the valve and the bottom of the material. With the lower end 26 of the rod 24 in the slot 27 of the shank p of the suspension pin, and with the tube 19 clamped by means of the set-screw 33, the operator then turns the rod 24 to unscrew the shank of the suspension pin from the plug 22 in the bottom of the tube 19. When the shank p is unscrewed from the plug 22 the head of the suspension pin will be forced downwardly into the material and this action will force the material down upon the top of the valve 8.

As the material remains more plastic in the lower part of the mold cavity, when the head of the suspension pin is manipulated as just described, its tapering walls will be freed from the surrounding material, and due to the shape of the head of the pin and the manner in which it is moved, a space will be left between the material and pin, as will be readily understood. The set-screw 33 is then released, and as the rod 24 is turned further, the pin P is screwed out of the lower end of the tube 19, which latter is prevented from turning by the pin 34 slipping into one of the slots 44 in the tube. The jig is then raised from the mold after the locking pin 34 has been released from the tube 19, whereupon the insulator is removed from the mold. It can then be annealed in the usual manner, and upon being removed from the annealing oven, the molten lead or solder can be poured or cast into the space surrounding the pin, to form the gasket U previously described.

It is to be understood, that while we have in the present case, described one form of apparatus for spacing the pin in the insulating material, we are not limited to the precise structure disclosed, and that other forms of apparatus may be utilized for this purpose without departing from the scope of the appended claims.

In our application, Serial No. 740,830, filed Sept. 30, 1924, which is a division of this application, we claim the insulator per se.

Having thus described our invention what we claim is:—

1. The process of manufacturing insulators having a suspension pin moulded therein, which comprises the steps of pressing a pin into the insulating material to embed it therein, and thereafter moving the pin with reference to the insulating material to space it therefrom without removing it from the insulating material.

2. The process of manufacturing insulators having a suspension pin moulded therein, which comprises the steps of pressing a pin into the insulating material to embed it therein, thereafter moving the pin with reference to the insulating material to space it therefrom, and filling the space with molten material to provide a gasket which will distribute the load.

3. In an apparatus for manufacturing insulators having molded therein a suspension pin, the combination of means for pressing the insulating material around and in contact with the pin and of means for pressing the pin finally into the insulating material after it has partly set.

4. In an apparatus for manufacturing insulators having a suspension pin molded therein, a mold having a valve in its base, means for lowering the valve after the forming operation to leave a space between the top of the valve and the material, and means for depressing the pin to force the material into the space thus formed, whereby a space is left between the pin and the surrounding portion of the insulator.

5. In an apparatus for manufacturing insulators having a suspension pin with an enlarged head molded therein, a mold having a valve in its base, means for lowering the valve after the forming operation to leave a space between the top of the valve and the material, and means for rotating the pin to thereby advance it and force the material into the space thus formed, whereby the head of the pin is spaced from the surrounding portion of the insulator.

In testimony whereof, we have hereunto signed our names this 28th day of June 1922.

JESSE T. LITTLETON, Jr.
GORDON S. FULCHER.